UNITED STATES PATENT OFFICE.

CHARLES CHEERS WAKEFIELD, OF LONDON, ENGLAND.

TREATMENT OF CALCIUM CARBID.

975,306.  Specification of Letters Patent.  Patented Nov. 8, 1910.

No Drawing.  Application filed February 4, 1909. Serial No. 476,608.

*To all whom it may concern:*

Be it known that I, CHARLES CHEERS WAKEFIELD, a subject of the King of England, and residing in London, England, have invented certain new and useful Improvements in the Treatment of Calcium Carbid, of which the following is a specification.

This invention relates to improvements in the treatment of calcium carbid, the object being to produce coherent blocks or cakes containing calcium carbid in a form suitable for use in acetylene generators and the like.

It is an important object of the present invention to avoid the use of moisture in the treatment of the calcium carbid, and, therefore, the treatment is a dry one so as to avoid deterioration of the carbid by the treatment thereof.

According to this invention powdered calcium carbid is treated with a mixture of hot sulfur and sugar before forming the cakes.

Preferably according to this invention the calcium carbid is heated before the addition of the coating and binding material which consists of a mixture of sulfur and sugar. Thus according to this invention powdered calcium carbid is first heated, incorporated with a mixture of sulfur and sugar, formed into blocks or cakes, dipped into suitable oil and then dried.

The following is an example of one method of carrying this invention into effect. The binding material consists of two parts by weight of powdered sulfur (flowers of sulfur) and one part by weight of sugar, well mixed together. Cheap refuse sugar is conveniently used. A suitable quantity of calcium carbid (of a size of one to five millimeters) is weighed out and heated in a closed iron pan or vessel to a temperature just below that at which the sulfur in the binding material would take fire. The necessary portion of binding material is then added to the carbid (in the proportion of one part by weight of binding material to ten parts by weight of carbid) the whole is well mixed together and kept warm.

The mold has the form of the so called diamond mold used by chemists, and consists of a bottom plate, a cylindrical mold and a die. The cylindrical mold is placed upon the plate so as to close one end, it is filled by means of a measuring can, the die is placed in the mold and pressed at a very high pressure by means of a heavy press, five to six blows giving the best result. The cylindrical mold is then removed from the bottom plate and the cake is forced out and allowed to cool. While the cake is still warm it is dipped in Mazut (blue oil) placed upon a wire sieve in order to allow superfluous oil to drop off and then dried, after which it is ready for use. The oil provides a waterproof coating for the blocks.

It is found in practice that it is necessary to keep the temperature to which the carbid or the mixture of carbid sugar and sulfur is heated between 100° and 170° C. It is preferred, however, to keep the temperature between 120° and 130° C. at which temperature the most satisfactory results are obtained.

It will be understood that the details of this process may be considerably varied without departing from this invention. Thus the sugar referred to may consist of ordinary sugar, glucose, or other saccharine substance; the blue oil referred to may be replaced by any other suitable oil.

To explain the advantages and the operation of the sulfur, it may be stated that in order to make a satisfactory block of carbid, the following essentials are desirable: The material to be used must be non-hygroscopic, and must contain no water or other compounds or elements within it which react on carbid of calcium. Sulfur fills these requirements admirably as it is not soluble in water and is non-hygroscopic. As the material is non-hygroscopic, and as it is necessary to admit water to the carbid, the binding material must be of such a nature that it will easily break up or otherwise admit water to the carbid when it is used.

The material must be capable of forming an extremely thin glaze over all of the pieces of carbid, so as to render the proportion of inert matter (binder) to active matter (carbid of calcium) as low as possible.

Now, it is well known that sulfur is such an extremely bad conductor of heat that if a piece of it be warmed even by being grasped in the hand it will be heard to crack by the unequal heating and will ultimately fall to pieces (see *Newth Inorganic Chemistry*).

In the manufacture of blocks the fused sulfur is thoroughly incorporated with the carbid and forms a thin film over the particles thereof. Therefore, in using the said blocks the following operation takes place: It is well known that the decomposition of calcium carbid by means of water liberates considerable heat. The outer skin of such a block consists of small pieces of carbid which under the microscope will be found to be insufficiently protected by the sulfur, the extremely fine glaze of the latter having been bruised by the considerable amount of force required to push the cake of carbid out of the steel die in which it has been made. To protect this outer layer, the cake is dipped in a suitable oil.

When placed in water for use, the bruised outer layer is at once attacked by the water. This sets up heat, which heat cracks the glaze of sulfur on the next layer of carbid and thereby admits water to it. However, the water although permeating the outmost layer of sulfur that surrounds those particles of carbid immediately in contact with the water prevents the water from penetrating immediately into the entire mass. As a consequence the block structure is not immediately destroyed, but the mass holds together until the layers of carbid are successively attacked and decomposed by the water. Therefore, although the generation of the acetylene gas begins immediately upon exposure of the block to water, it is not quickly disintegrated and the gas generating operation can be suspended whenever desired, the block still retaining its structure.

What I claim as my invention and desire to secure by Letters Patent is:—

1. The herein described process of treating calcium carbid, which consists in mixing together calcium carbid and a protecting and binding agent containing sulfur, and heating said sulfur whereby it is fused in the mixture.

2. The herein described process of treating calcium carbid, which consists in mixing together calcium carbid, sulfur and sugar, and heating said sulfur whereby it is fused throughout the mixture.

3. The herein described process of treating calcium carbid, which consists in thoroughly intermingling a mass of calcium carbid and sulfur at a temperature that will cause the sulfur to become fused and coat the carbid particles throughout the mass.

4. The herein described process of forming calcium carbid into blocks which consists in heating the calcium carbid, mixing it with a dry protecting and binding agent containing sulfur and sugar and heating the sulfur and sugar to fuse the same and compressing the mixture into blocks.

5. The herein described process of forming calcium carbid blocks, which consists in heating the calcium carbid, mixing it with a protecting and binding agent composed of sulfur and sugar, heating the sulfur and sugar to fuse throughout the mixture, compressing the mixture into blocks, and dipping said blocks into oil.

6. As an article of manufacture, a carbid block comprising a mass of calcium carbid particles, and a binding agent of fused sulfur incorporated with and permeating the mass, said sulfur coating the carbid particles.

7. As an article of manufacture, a carbid block, comprising a mass of calcium carbid particles, and a binding agent of fused sulfur and sugar incorporated with and permeating the mass, said sulfur coating the carbid particles throughout the mass.

In testimony whereof I have signed my name to this specification in the presence of two subscribing witnesses.

CHARLES CHEERS WAKEFIELD.

Witnesses:
A. NUTTING,
H. D. JAMESON.